United States Patent [19]

Grover et al.

[11] 4,302,724
[45] Nov. 24, 1981

[54] PICKUP PROBE FOR ENGINE TIMING

[75] Inventors: Donald D. Grover; Norbert C. Neumann, both of Kenosha, Wis.

[73] Assignee: Snap-on Tools Corporation, Kenosha, Wis.

[21] Appl. No.: 62,111

[22] Filed: Jul. 30, 1979

[51] Int. Cl.³ ............................. G01R 1/04; H01F 7/20
[52] U.S. Cl. ..................................... 324/402; 324/173; 335/285
[58] Field of Search ............... 324/402, 391, 392, 173, 324/174; 335/285; 248/206 A

[56] References Cited

U.S. PATENT DOCUMENTS

| | | | |
|---|---|---|---|
| 3,068,573 | 12/1962 | Sidwell | 248/206 A |
| 3,616,622 | 11/1971 | Friedman | 335/285 |
| 3,710,246 | 1/1973 | Herring | 324/174 |
| 3,793,545 | 2/1974 | Leiber et al. | 324/174 |
| 4,089,316 | 5/1978 | Padgitt | 324/391 |

Primary Examiner—Ernest F. Karlsen
Attorney, Agent, or Firm—Vogel, Dithmar, Stotland, Stratman & Levy

[57] ABSTRACT

A pickup probe for engine timing which is responsive electrically to an indicator on a rotating engine part. The free end of the probe is adapted to extend through an access opening in an engine member into proximity with the indicator on the rotating engine part. A sensor is contained within the free end portion of the probe. The probe includes a mounting means adapted to be detachably secured to the engine member adjacent the aforesaid access opening. The free end of the probe has limited longitudinal movement with respect to the mounting means so as to accommodate dimensional irregularities in the engine and enable the free end of the probe to be moved in adjusting manner to a selected longitudinal position with respect to the rotating part indicator to establish an effective air gap, and means are provided to maintain the free end of the probe in the selected position, thereby insuring continued proper spacing of the sensor and indicator by the effective air gap and the generation of timing signals of high quality for processing in associated equipment.

9 Claims, 4 Drawing Figures

U.S. Patent      Nov. 24, 1981      4,302,724
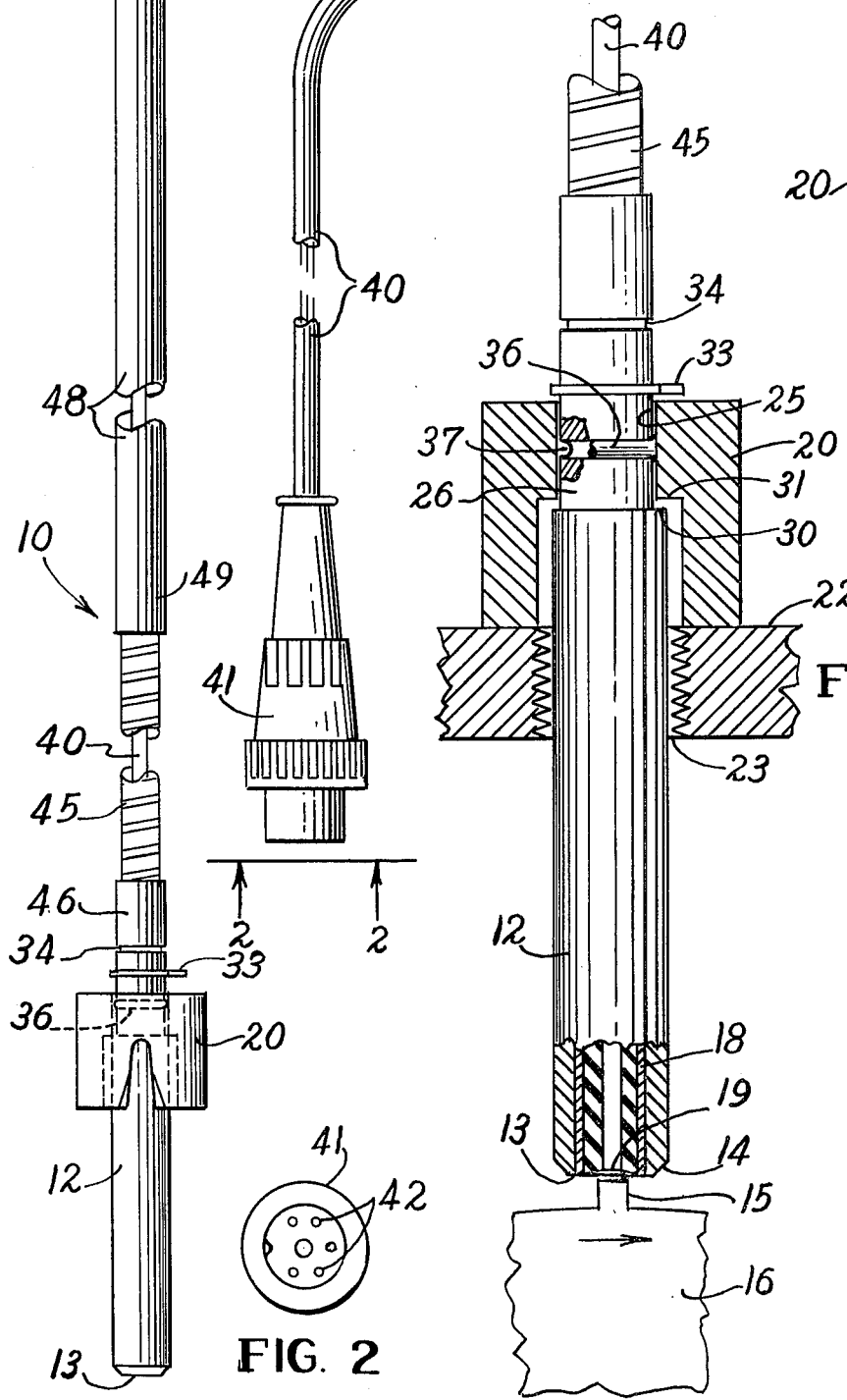

4,302,724

PICKUP PROBE FOR ENGINE TIMING

BACKGROUND OF THE INVENTION

This invention relates to a pickup probe for engine timing, and more particularly to a pickup probe designed to extend through an access opening in an engine member such as a housing or bracket. The probe is adapted to respond to an indicator on a rotating engine part, such as the crank shaft, and an electric signal is generated each time the indicator moves by the end of the probe.

The signals generated by the probe are fed to associated equipment, usually a meter, and are utilized in performing engine tests such as initial engine timing, advance engine timing, engine RPM checks, vacuum advance and mechanical advance.

Engines with which the pickup probe of the invention is used are subject to dimensional irregularities due to tolerances, wear or both. Accordingly, the present pickup probe is provided with adjustment capability so as to accommodate the dimensional irregularities.

One object of the invention is to provide a pickup probe for engine timing that is mountable on the exterior of an engine member adjacent an access opening. The free end of the probe is adapted to extend through the access opening and to be moved longitudinally to a selected position where the probe end is spaced from the indicator on a rotating engine part by an effective air gap which produces quality signals, as displayed in the associated equipment.

Another object of the invention is to provide a pickup probe that will maintain its adjusted, selected position with respect to the indicator on the rotating engine part during the testing period, thereby insuring timing signals of consistently high quality.

Another object of the invention is to provide a pickup probe wherein the sensor thereof is located in spaced recessed relation with the free end of the probe so as to establish a portion of the air gap between the sensor and the indicator, and to protect the sensor from damage resulting from possible engagement of the probe with the indicator.

Applicants are unaware of prior art believed to be pertinent to this development.

SUMMARY OF THE INVENTION

The pickup probe of the invention includes an elongated tubular member adapted to extend through an access opening in the engine member, the free end of the member adapted to be located in proximity with a projecting indicator on a rotating engine part. The free end of the tubular member at the periphery has an annular chamfer, thus providing a tapered cam surface which may engage without damage the projecting indicator on the rotating engine part and cooperate in adjusting the probe to establish an effective air gap. A sensor mounted in the tubular member has recessed relation with the free end of the member so as to establish a portion of the effective air gap between the sensor and the rotating engine part indicator. The sensor, of course, generates an electric signal each time the indicator passes the end of the probe.

The probe includes mounting means adapted to be detachably secured to the engine member with the tubular member on the probe extending through the access opening.

Cooperating first means are provided on the tubular member and on the mounting means for permitting limited longitudinal movement of the tubular member with respect to the mounting means, thereby enabling the tubular member to be moved to a selected position wherein the free end of the tubular member establishes an effective air gap with the rotating part indicator. Cooperating second means also are provided in effective relation with the tubular member and the mounting means which enables the tubular member to maintain the selected position during use of the probe.

BRIEF DESCRIPTION OF THE DRAWING

FIG. 1 is an elevational view of a pickup probe for engine timing embodying the invention.

FIG. 2 is an elevational view taken on line 2—2 of FIG. 1.

FIG. 3 is an enlarged view, partly in section and partly broken away, of a portion of the probe shown in FIG. 1, the probe portion being shown in effective relation with an engine member, an access opening therein and with a rotating engine part having an indicator to which the probe responds by producing an electric signal.

FIG. 4 is a perspective view of the illustrated mounting means forming part of the probe, namely a permanent magnet of the annular side pole type.

DESCRIPTION OF THE PREFERRED EMBODIMENT

Referring to FIG. 1 of the drawing, the illustrated pickup probe for engine timing embodying the invention is generally designated 10.

Probe 10 includes an elongated tubular member 12 adapted to extend through an access opening in an engine member, the free end 13 of tubular member 12 being adapted to have effective spaced relation with a projecting indicator 15 (FIG. 3) carried on the periphery of a rotating engine part 16. Free end of tubular member 12 is tapered (provided with a chamfer) as shown at 14 to avoid possible damaging interference with indicator 15 and to cooperate in adjusting the probe to establish an effective air gap.

Still referring to FIG. 3, a sensor 18 is contained within tubular member 12. Sensor 18 is conventional, and may be a digital magnetic sensor purchased from Electro Corporation, Sarasota, Fla. Such sensor is identical to Electro Corporation digital magnetic sensor No. 58407, except that it has reversed polarity.

The effective end 19 of sensor 18 has recessed relation with free end 13 of tubular member 12, as shown in FIG. 3. This relation establishes a portion of an effective air gap between sensor end 19 and indicator 15 of rotating engine part 16, and affords protection to the sensor.

Probe 10 includes a mounting means 20 on tubular member 12, mounting means 20 being adapted to be detachably secured to engine member 22 (FIG. 3) with tubular member 12 extending through access opening 23 in member 22. As shown, access opening 23 is threaded to receive a threaded plug (not shown) which closes opening 23 when probe 10 is not being used.

Mounting means 20, as shown, is a permanent magnet, and, in particular, is a permanent magnet of the annular side pole type. As shown in FIG. 3, central opening 25 of magnet 20 loosely receives reduced-diameter length 26 of tubular member 12. Accordingly, tubular member 12 is movable longitudinally with respect to the mounting means or magnet 20. As previously mentioned, relative movement between tubular member 12 and mounting means 20 enables probe 10 to be adjusted longitudinally to compensate for dimensional irregularities in engines with which the probe is used and yet obtain the effective air gap spacing.

The encountered dimensional irregularities generally are small, and therefore it is only necessary to provide for limited longitudinal movement between tubular member 12 and mounting means 20. The longitudinal movement is limited by cooperating first means which, as shown, include annular shoulders 30 and 31 respectively on tubular member 12 and mounting means 20. These two shoulders engage and establish a stop in one direction of movement (outward). The stop in the other direction of movement (inward) is a mechanical stop which in the form of the invention illustrated is a split retainer ring 33 disposed in an annular groove (not shown) located in reduced length 26 of tubular member 12.

As shown, reduced length 26 is provided with a second annular groove 34. Split retainer ring 33 may be removed from the first position shown, and replaced in groove 34 in the event the engine being tested possesses dimensional irregularities which require a longer length of travel for tubular member 12. The annular groove which receives the split retainer ring 33 shown in FIG. 3, of course, is the same as the illustrated annular groove 34.

Probe 10 includes a cooperating second means in effective relation with tubular member 12 and mounting means 20 which enables tubular member 12 to maintain the adjusted selected position it occupies when the free end 13 is adjusted properly with respect to indicator 15 of rotating engine part 16. In the illustrated form of the invention, the cooperating second means establishes a frictional relationship between tubular member 12 and mounting means 20. As shown, the aforesaid frictional relationship is established by a frictional O-ring 36 which is disposed in slot 37 in reduced-diameter length 26 of tubular member 12, the O-ring being in snug engagement with the wall of central opening 25 of magnet 20.

Completing the description of probe 10, sensor 18 includes a cable 40 adapted to connect the sensor to an indicating means such as a meter (not shown) calibrated to display the information for the test being performed. Cable 40 terminates in a plug 41 for reception in the meter or other indicating means. The end of plug 41 is shown in FIg. 2, the pins thereof being designated 42.

In the illustrated form of the invention, a cable-carrying flexible tube 45 is secured to tubular member 12 at end 46 of the member. Flexible tube 45 enables the working end of probe 10 to adjust as necessary to avoid obstruction in the engine compartment.

A cable-carrying extension tube 48 is connected at end 49 to flexible tube 45 and a knob type handle member 50 is secured to extension tube 48, as shown in FIG. 1. Cable 40 extends beyond the handle member for connection to plug 41.

From the above description it is thought that the construction and advantages of the invention will be readily apparent to those skilled in the art. Various changes in detail may be made without departing from the spirit or losing the advantages of the invention.

Having thus described the invention, what is claimed as new and desired to secure by Letters Patent is:

1. A pickup probe for engine timing adapted to extend through an access opening in an engine member into proximity with a projecting indicator on a rotating engine part comprising:

a tubular member having a free end, the periphery thereof having an annular chamfer providing a tapered cam surface which may engage without damage the projecting indicator and cooperate in adjusting the probe to establish an effective air gap;

a sensor mounted within said tubular member in recessed relation with the free end thereof, said sensor being responsive to the indicator when spaced therefrom by an effective air gap;

mounting means on said tubular member adapted to be detachably secured to the engine member with said tubular member extending through the access opening;

cooperating first means on said tubular member and said mounting means permitting limited longitudinal adjusting movement of said member with respect to said mounting means which enables said tubular member to be moved to a selected position establishing an effective air gap; and cooperating second means in effective relation with said tubular member and said mounting means enabling said tubular member to maintain said selected position;

whereby said tubular member may be positioned without damage in effective relation with the indicator on the rotating engine part despite dimensional irregularities in the engine and said sensor will be spaced from the indicator by the effective air gap.

2. The pickup probe of claim 1 wherein said mounting means is a permanent magnet.

3. The pickup probe of claim 2 wherein said permanent magnet is of the annular side pole type.

4. The pickup probe of claim 1 wherein said cooperating first means includes abutting shoulders on said tubular member and said mounting means and a mechanical stop on said tubular member in spaced relation with the abutting shoulder thereon, said mechanical stop adapted to engage said mounting means to limit the longitudinal movement of said tubular member with respect to said mounting means.

5. The pickup probe of claim 4 wherein said mechanical stop is a split retainer ring disposed in an annular groove in said tubular member.

6. The pickup probe of claim 5 with the addition of a second annular groove in said tubular member, whereby said split retainer ring may be disposed in said second annular groove to increase the length of the longitudinal movement of said tubular member with respect to said mounting means to accommodate increased dimensional irregularities in the engine.

7. The pickup probe of claim 1 wherein said cooperating second means establishes a frictional relationship between said tubular member and said mounting means that enables said tubular member to maintain said selected position.

8. The pickup probe of claim 1 wherein said cooperating second means includes a frictional O-ring between said tubular member and said mounting means, said O-ring establishing a frictional relation that enables said tubular member to maintain said selected position.

9. The pickup probe of claim 1 wherein said sensor includes a cable adapted to connect said sensor to an indicating means, and with the addition of a cable-carrying flexible tube secured to said tubular member, said flexible tube enabling the probe to avoid obstructions, a cable-carrying extension tube secured to said flexible tube, a handle member secured to said extension tube, said cable extending beyond said handle member for connection to the indicating means.

* * * * *